(12) United States Patent
Hamada et al.

(10) Patent No.: US 8,420,735 B2
(45) Date of Patent: Apr. 16, 2013

(54) MODIFIED MICROFIBRILLATED CELLULOSE AND RESIN COMPOSITE MATERIAL CONTAINING THE SAME

(75) Inventors: Kenichi Hamada, Sakura (JP); Tetsuya Harada, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/517,330

(22) PCT Filed: Dec. 21, 2010

(86) PCT No.: PCT/JP2010/072950
§ 371 (c)(1),
(2), (4) Date: Aug. 17, 2012

(87) PCT Pub. No.: WO2011/078142
PCT Pub. Date: Jun. 30, 2011

(65) Prior Publication Data
US 2012/0309898 A1 Dec. 6, 2012

(30) Foreign Application Priority Data
Dec. 22, 2009 (JP) ................. 2009-290509

(51) Int. Cl.
C08B 37/00 (2006.01)
C04B 24/38 (2006.01)
C08L 1/00 (2006.01)
C08G 77/12 (2006.01)

(52) U.S. Cl.
USPC .......... 525/54.21; 525/54.23; 524/35; 528/31

(58) Field of Classification Search .............. 524/35; 528/31; 525/54.21, 54.23
See application file for complete search history.

(56) References Cited

U.S. PATENT DOCUMENTS
2008/0177022 A1  7/2008  Yamasaki et al.

FOREIGN PATENT DOCUMENTS

| JP | 50-038720 B | 12/1975 |
| JP | 04-211480 A | 8/1992 |
| JP | 2001-072916 A | 3/2001 |
| JP | 2002-524618 A | 8/2002 |
| JP | 2007-119620 A | 5/2007 |
| JP | 2007-119680 A | 5/2007 |
| JP | 2008088259 A * | 4/2008 |
| JP | 2008266630 A * | 11/2008 |

OTHER PUBLICATIONS

International Search Report of PCT/JP2010/072950, mailing date of Jan. 25, 2011.

* cited by examiner

*Primary Examiner* — Michael M Bernshteyn
(74) *Attorney, Agent, or Firm* — Westerman, Hattori, Daniels & Adrian, LLP

(57) ABSTRACT

A modified microfibrillated cellulose, a resin composition and a resin composite material that contain the modified microfibrillated cellulose are provided. In a modified microfibrillated cellulose according to the present invention, a hydrolyzable-silyl-group-containing resin (A) bonds to or adheres to a cellulose surface and a silicon atom content is 0.01 to 0.5 atomic percent. A resin composition containing 0.1% to 10% by weight of the modified microfibrillated cellulose is also provided.

12 Claims, No Drawings

MODIFIED MICROFIBRILLATED CELLULOSE AND RESIN COMPOSITE MATERIAL CONTAINING THE SAME

TECHNICAL FIELD

The present invention relates to a modified microfibrillated cellulose that is excellent in miscibility with a resin and gives a molded resin product excellent in mechanical properties, in particular, fracture toughness; a resin composition and a resin composite material that contain the modified microfibrillated cellulose.

BACKGROUND ART

Cell walls of all plants have, as basic skeletons, high-strength nanofibers having a width of about 4 nm referred to as microfibrillated cellulose. Microfibrillated cellulose is nanofibers constituted by extended-chain crystals and obtained by fibrillating vegetable fibers such as pulp to the level of microfibrillated cellulose. In addition, microfibrillated cellulose derived from bacteria (mainly, Acetobacter) is also known; and a food employing this microfibrillated cellulose is nata de coco, which is well known. It is known that microfibrillated cellulose can be generally produced by milling or beating cellulose fibers with a refiner, homogenizer, or the like (for example, refer to Patent Literature 1). Microfibrillated cellulose is lightweight and has high strength and high biodegradability, and hence is expected to be applied to wide-ranging fields: for example, casings of household electrical appliances such as personal computers and cellular phones, office equipment such as writing materials, sports goods, transport equipment, and building materials.

In recent years, a microfibrillated cellulose that can be dispersed in an organic solvent by surface modification of the cellulose with a monoisocyanate has been known (Patent Literature 2).

Although such modified microfibrillated cellulose is dispersed in an organic solvent, it still has hydrophilicity due to remaining of hydroxyl groups on the surface and hence it is not satisfactory. The modified microfibrillated cellulose has the following problems: when the modified microfibrillated cellulose is added to a resin, the phenomenon of agglomeration and aggregation occurs; and, even when the modified microfibrillated cellulose is mixed with a resin, the mechanical properties of the resin are not enhanced.

A method has been studied in which microfibrillated cellulose is surface-treated with a silane coupling agent and then combined with a resin to produce a composite resin to thereby provide the composite resin having enhanced mechanical properties (Patent Literature 3). However, in such a case, since the surface-treatment agent is a silane coupling agent, which is a low-molecular-weight monomer, a large amount of the silane coupling agent needs to be bonded to the surface of microfibrillated cellulose so that the silane coupling agent exhibits its capability, that is, a composite resin having enhanced mechanical properties is provided. When bonding of such a larger amount of the silane coupling agent to the surface of microfibrillated cellulose is attempted, polycondensation between molecules of the silane coupling agent, which is a side reaction, occurs during the surface treatment and the treatment cannot be efficiently performed, which has been problematic.

CITATION LIST

Patent Literature

PTL 1: Japanese Examined Patent Application Publication No. 50-38720
PTL 2: Japanese Unexamined Patent Application Publication (Translation of PCT Application) No. 2002-524618
PTL 3: Japanese Unexamined Patent Application Publication No. 2008-266630

SUMMARY OF INVENTION

Technical Problem

An object of the present invention is to provide a modified microfibrillated cellulose that can be dispersed in and uniformly mixed with a hydrophobic resin without causing agglomeration. Specifically, modification of microfibrillated cellulose can provide a modified microfibrillated cellulose excellent in dispersibility and affinity for (reactivity with) a resin: agglomerate due to proximity to, entanglement between, or hydrogen bonds between fibers is not generated. Addition of the modified microfibrillated cellulose to a resin provides a resin composite material for molding that gives a molded resin product excellent in mechanical properties, in particular, fracture toughness.

The present invention also relates to a modified microfibrillated cellulose that has been modified with a surface-treatment agent that provides a function such as enhancement of mechanical properties even when the amount of the surface-treatment agent bonding to or adhering to the cellulose surface is small.

Solution to Problem

The inventors thoroughly studied a modification method for providing a microfibrillated cellulose excellent in mixing dispersibility in a resin and excellent in affinity for (reactivity with) a resin. As a result, the inventors have accomplished the present invention.

Specifically, the present invention provides a modified microfibrillated cellulose wherein a hydrolyzable-silyl-group-containing resin (A) bonds to or adheres to a cellulose surface, and a silicon atom content is 0.01 to 0.5 atomic percent; and a resin composition and a resin composite material that contain the modified microfibrillated cellulose.

Advantageous Effects of Invention

In a modified microfibrillated cellulose according to the present invention, a hydrolyzable-silyl-group-containing resin (A), which is a polymer, is made to bond to or adhere to the microfibrillated cellulose; and the microfibrillated cellulose has been modified with a small amount of the resin such that the silicon atom content becomes 0.01 to 0.5 atomic percent. Accordingly, when the modified microfibrillated cellulose is mixed with another resin, it exhibits excellent dispersibility and affinity for (reactivity with) the resin.

This dispersibility is probably provided because a hydrolyzable silyl group is introduced into the resin skeleton and hence molecular motion is controlled and a side reaction such as polycondensation between the hydrolyzable silyl groups is less likely to occur. A resin composite material containing a modified microfibrillated cellulose according to the present invention can provide a molded resin product excellent in fracture toughness.

By making the hydrolyzable-silyl-group-containing resin (A) bond to or adhere to a microfibrillated cellulose, the microfibrillated cellulose molecules probably repel each other due to the hydrolyzable-silyl-group-containing resin (A) adhering to the surfaces thereof, as a result, agglomeration of the microfibrillated cellulose is suppressed and a uniform treatment can be performed. In addition, by adding a modified microfibrillated cellulose according to the present invention to a resin, mechanical properties of a cured product of the resin, such as fracture toughness, can be considerably enhanced.

DESCRIPTION OF EMBODIMENTS

A modified microfibrillated cellulose according to the present invention has a silicon atom content of 0.01 to 0.5 atomic percent, preferably 0.1 to 0.3 atomic percent. Out of such a range, the modified microfibrillated cellulose agglomerates without dispersing in a resin to be combined with the modified microfibrillated cellulose. The silicon atom content is determined in the following manner. A hydrolyzable-silyl-group-containing resin (A) and a microfibrillated cellulose are brought into contact with each other and then heated. To the mixture solution (10 g) of the modified microfibrillated cellulose sampled, 80 g of xylene is added and the resultant solution is stirred with a TK HOMO DISPER of a TK ROBO-MIX at 3000 rpm for 10 minutes. After that, the solvent is removed by suction filtration and the modified microfibrillated cellulose is washed. Another washing process is performed with xylene. The modified microfibrillated cellulose/xylene slurry (1 g) is then sampled and dried at 150° C. for an hour. The surface of the dried modified microfibrillated cellulose is subjected to elemental analysis at a magnification of 1000 times with an energy dispersive X-ray analyzer (JSM-5900LV, manufactured by JEOL Ltd.) to determine the atomic percent of silicon atoms. This silicon content is defined as the amount of silicon adhering to the modified microfibrillated cellulose.

In the present invention, the step of making the hydrolyzable-silyl-group-containing resin (A) bond to or adhere to an untreated microfibrillated cellulose essentially includes a step of bringing an unmodified microfibrillated cellulose and the hydrolyzable-silyl-group-containing resin (A) into contact with each other and a subsequent heating step (preferably at 50° C. to 150° C.). This treatment method will be described below in detail.

(Microfibrillated Cellulose)

A microfibrillated cellulose is produced by a publicly known production method. In general, a microfibrillated cellulose is produced by milling and/or beating a cellulose-fiber-containing material with a refiner, a high-pressure homogenizer, a medium-stirring mill, a stone mill, a grinder, or the like to thereby achieve fibrillation or size reduction. Alternatively, a microfibrillated cellulose may be produced by a publicly known method such as a method described in Japanese Unexamined Patent Application Publication No. 2005-42283. Alternatively, a microfibrillated cellulose may be produced with bacteria (such as Acetobacter). Alternatively, a commercially available product may be used. Known cellulose-fiber-containing materials are derived from plants (such as wood, bamboo, hemp, jute, kenaf, waste from crops, cloth, pulp, recycled pulp, and wastepaper), animals (such as sea squirts), algae, bacteria (such as Acetobacter), and bacterial products. Any of these materials may be used in the present invention. Cellulose fibers derived from plants or bacteria are preferably used, more preferably, cellulose fibers derived from plants.

A microfibrillated cellulose may be treated with an alkaline solution (such as an aqueous solution of an alkali metal hydroxide or aqueous ammonia). A microfibrillated cellulose may be produced in the following manner. A cellulose-fiber-containing material is optionally formed with a refiner or the like into a shape (such as a powder, fibers, or a sheet) suitable for efficiently performing a treatment with an alkaline solution. The material is then treated with the alkaline solution. The resultant substance is treated by a publicly known fibrillation or size-reduction technique used for production of microfibrillated cellulose: in general, by milling and/or beating the substance with a high-pressure homogenizer, a medium-stirring mill, a stone mill, a grinder, or the like.

Alternatively, a commercially available microfibrillated cellulose such as CELISH (DAICEL CHEMICAL INDUSTRIES, LTD.) may be used.

A microfibrillated cellulose preferably has an average fiber diameter of 4 nm to 400 nm, more preferably 4 nm to 200 nm, still more preferably 4 nm to 100 nm. A microfibrillated cellulose has a fiber length that is very large with respect to the fiber diameter. Although the fiber length is difficult to determine, the average fiber length is preferably 5 times or more, more preferably 10 times or more, still more preferably 20 times or more, the fiber diameter. For example, the average fiber length is preferably 50 nm to 200 μm, more preferably 100 nm to 50 μm.

(Hydrolyzable-Silyl-Group-Containing Resin (A))

In the present invention, the hydrolyzable-silyl-group-containing resin (A) is used as a surface-treatment agent for a microfibrillated cellulose.

Although the hydrolyzable-silyl-group-containing resin (A) may be any resin having a hydrolyzable silyl group, it is preferably a polymer having a hydrolyzable silyl group and another functional group that is not a hydrolyzable silyl group. The polymer preferably has a number-average molecular weight of 500 or more, more preferably 1000 or more, particularly preferably 1000 to 3000. The number-average molecular weight is obtained by measurement with HLC8220 (Tosoh Corporation) and calculation in terms of polystyrene standards. The polymer preferably has a hydrolyzable silyl group and a plurality of functional groups that are not hydrolyzable silyl groups. In the hydrolyzable-silyl-group-containing resin (A), the ratio of the hydrolyzable silyl group and functional groups that are not hydrolyzable silyl groups is preferably 1:1 to 10. When this range is satisfied, excellent dispersibility in a resin is achieved and the fracture toughness of a cured product of the composite resin can be enhanced.

The polymer is, for example, one or more selected from various thermosetting resins and thermoplastic resins, such as vinyl resins, (meth)acrylic resins, urethane resins, silicone resins, polyester resins, epoxy resins, phenolic resins, and olefin resins. The polymer is preferably a (meth)acrylic resin, particularly preferably an aqueous acrylic resin.

(Functional Group that is not Hydrolyzable Silyl Group)

The functional group that is not a hydrolyzable silyl group is a functional group that is not a hydrolyzable silyl group and reacts with another functional group. For example, the functional group is one or more selected from a hydroxyl group, a carboxyl group, a vinyl group, an epoxy group, an amino group, an aldehyde group, a thiol group, a sulfonic group, an azo group, and the like. The functional group is preferably an epoxy group.

The hydrolyzable silyl group is a silicon-containing group represented by a composition formula $R_nSiX_{4-n}$ (in the formula, R represents at least one organic group selected from the group consisting of an alkyl group, an aryl group, and an unsaturated fatty acid residue that have 1 to 10 carbon atoms and optionally have a substituent; X represents an alkoxy group; n represents an integer of 0 to 3; and R and X may be the same as or different from each other). The hydrolyzable silyl group may be a silanol group or an alkoxy silyl group.

The hydrolyzable silyl group is hydrolyzed to produce a hydroxyl group.

The hydrolyzable-silyl-group-containing resin (A) has at least one hydrolyzable silyl group in a single molecule and is preferably a (meth)acrylic resin. The (meth)acrylic resin can be prepared by (co)polymerization of a hydrolyzable-silyl-group-containing unsaturated monomer, an acrylic monomer, and optionally another polymerizable unsaturated monomer in a standard manner.

The hydrolyzable-silyl-group-containing unsaturated monomer is a compound having at least one hydrolyzable silyl group and at least one polymerizable double bond in a single molecule. Examples of this compound include trialkyl siloxy alkyl(meth)acrylates such as trimethylsiloxyethyl (meth)acrylate, trimethylsiloxypropyl(meth)acrylate, trimethylsiloxybutyl(meth)acrylate, triethylsiloxyethyl(meth) acrylate, triethylsiloxypropyl(meth)acrylate, triethylsiloxybutyl(meth)acrylate, and tributylsiloxypropyl (meth)acrylate; triphenylsiloxyalkyl(meth)acrylates; and dimethyl-tert-butylsiloxyalkyl(meth)acrylates. The examples further include N-methylol(meth)acrylamide, β-hydroxyethyl(meth)acrylate, ε-caprolactone adducts of the foregoing, and silylated compounds from polyoxyalkylene glycol(meth)acrylates and the like.

A silane coupling agent such as 3-methacryloxypropyltrimethoxysilane, 3-methacryloxypropyltriethoxysilane, 3-methacryloxypropylmethyldimethoxysilane, 3-methacryloxypropylmethyldiethoxysilane, or 3-acryloxypropyltrimethoxysilane may be used.

Examples of the acrylic monomer include alkyl (C1-22) esters of (meth)acrylic acid and alkoxy (C1-10) esters of (meth)acrylic acid.

The alkyl (C1-22) esters of (meth)acrylic acid denote monoester compounds between (meth)acrylic acid and monohydric alcohol having 1 to 22 carbon atoms. Examples of these esters include methyl(meth)acrylate, ethyl(meth) acrylate, propyl(meth)acrylate, butyl(meth)acrylate, hexyl (meth)acrylate, octyl(meth)acrylate, lauryl(meth)acrylate, 2-ethylhexyl(meth)acrylate, and cyclohexyl(meth)acrylate. The alkoxy esters denote alkoxy esters (having 2 to 18 carbon atoms) of (meth)acrylic acid and examples thereof include methoxybutyl(meth)acrylate and methoxyethyl(meth)acrylate.

The other polymerizable unsaturated monomer denotes a polymerizable unsaturated compound that is not the hydrolyzable-silyl-group-containing unsaturated monomer or the acrylic monomer. Specific examples thereof include carboxyl-group-containing unsaturated monomers such as acrylic acid, methacrylic acid, maleic acid, and fumaric acid; glycidyl-group-containing unsaturated monomers such as glycidyl(meth)acrylate and allyl glycidyl ether; aromatic-ring-containing unsaturated monomers such as styrene, α-methylstyrene, and vinyltoluene; and nitrogen-containing unsaturated monomers such as vinylpyridine, acrylamide, N-butoxydimethylacrylamide, and acrylonitrile.

The other polymerizable unsaturated monomer preferably has a functional group having reactivity with a resin for combination.

The hydrolyzable-silyl-group-containing acrylic resin (A) may be prepared by blocking the hydroxyl groups of a hydroxyl-group-containing acrylic resin with a silylating agent such as a trialkylmonochlorosilane compound.

In the hydrolyzable-silyl-group-containing resin (A), although the proportions of the monomers are not particularly limited, preferred proportions with respect to the total weight of monomers forming the resin (A) are as follows: the proportion of the hydrolyzable-silyl-group-containing unsaturated monomer is in the range of 1% to 100% by weight, in particular, in the range of 20% to 50% by weight; the proportion of the acrylic monomer is in the range of 99% to 0% by weight, in particular, in the range of 50% to 80% by weight; and the proportion of the other monomer is in the range of 0% to 80% by weight, in particular, in the range of 10% to 60% by weight.

The resin (A) can be prepared by (co)polymerizing the hydrolyzable-silyl-group-containing unsaturated monomer having two or more hydrolyzable silyl groups, preferably two hydrolyzable silyl groups, in a single molecule, optionally an acrylic monomer and another monomer by a known method such as radical polymerization.

The resin (A) is preferably a polymer having a number-average molecular weight of 500 or more, more preferably 1000 to 3000.

Examples of a polymerization initiator usable in the copolymerization of the monomers in an organic solvent include various azo compounds such as 2,2'-azobisisobutyronitrile, 2,2'-azobis-methylbutyronitrile, 2,2'-azobis-2,4-dimethylvaleronitrile, 1,1'-azobis-cyclohexanecarbonitrile, dimethyl-2,2'-azobisisobutyrate, 4,4'-azobis-4-cyanovaleric acid, 2,2'-azobis-(2-amidinopropene)dihydrochloride, 2-tert-butylazo-2-cyanopropane, 2,2'-azobis-(2-methyl-propionamide)dihydrate, 2,2'-azobis-[2-(2-imidazoline-2-yl)propene], and 2,2'-azobis-(2,2,4-trimethylpentane);

various ketone peroxides, peroxyketals, hydroperoxides, dialkyl peroxides, diacyl peroxides, peroxy esters, and peroxy dicarbonates, such as benzoyl peroxide, methyl ethyl ketone peroxide, cumene hydroperoxide, potassium persulfate, tert-butyl peroxyneodecanoate, tert-butyl peroxypivalate, tert-butyl peroxy-2-ethylhexanoate, tert-butyl peroxyisobutyrate, 1,1-bis-tert-butyl peroxy-3,3,5-trimethylcyclohexane, tert-butyl peroxylaurate, tert-butyl peroxyisophthalate, tert-butyl peroxyacetate, tert-butyl peroxybenzoate, dicumyl peroxide, and di-tert-butyl peroxide; and hydrogen peroxide.

The organic solvent usable in the copolymerization of the monomers in an organic solvent may be a publicly known and commonly used organic solvent. Examples of the organic solvent include alkyl alcohols such as methanol, ethanol, n-propanol, isopropanol, n-butanol, isobutanol, sec-butanol, tert-butanol, n-pentanol, and isopentanol;

glycol ethers such as methyl cellosolve, ethyl cellosolve, ethylene glycol dimethyl ether, ethylene glycol diethyl ether, propylene glycol monomethyl ether, propylene glycol monoethyl ether, propylene glycol monopropyl ether, propylene glycol dimethyl ether, and propylene glycol diethyl ether;

aromatic hydrocarbons such as benzene, toluene, xylene, and ethyl benzene; hydrocarbon mixtures containing aromatic hydrocarbons such as Exxon Aromatic Naphtha No. 2 (manufactured by Exxon Corporation in the USA); hydrocarbon mixtures containing aliphatic hydrocarbons such as Isopar C, Isopar E, Exxsol DSP100/140, Exxsol D30 (all manufactured by Exxon Corporation in the USA), and IP Solvent 1016 (manufactured by Idemitsu Petrochemical Co., Ltd.); alicyclic hydrocarbons such as cyclopentane, cyclohexane, methylcyclohexane, and ethylcyclohexane;

ethers such as tetrahydrofuran, dioxane, diisopropyl ether, and di-n-butyl ether; ketones such as acetone, methyl ethyl ketone, and methyl isobutyl ketone; and esters such as methyl acetate, ethyl acetate, n-propyl acetate, isopropyl acetate, n-butyl acetate, isobutyl acetate, n-amyl acetate, isoamyl acetate, hexyl acetate, ethyl propionate, and butyl propionate.

A chain transfer agent may be optionally used. Examples of the chain transfer agent include dodecyl mercaptan, lauryl mercaptan, thioglycolic acid esters, mercaptoethanol, and α-methylstyrene dimer.

A method for producing a modified microfibrillated cellulose according to the present invention is performed, for example, in the following manner.

The hydrolyzable-silyl-group-containing resin (A) is first mixed with water containing a catalyst such as an acid to hydrolyze the hydrolyzable silyl groups. The resultant solution is brought into contact with a microfibrillated cellulose. As a result of this treatment, the hydrolyzed silyl groups probably bond to the surface of the microfibrillated cellulose via hydrogen bonds. The resultant solution is then heat-treated. As a result of the heat treatment, dehydration condensation between the hydrolyzed silyl groups and hydroxyl groups in the surface of the microfibrillated cellulose probably occurs to form covalent bonds. Thus, the hydrolyzable-silyl-group-containing resin (A) is strongly bonded to the surface of the microfibrillated cellulose. The heating temperature is equal to or less than the boiling point of the hydrolyzable-silyl-group-containing resin (A) and is preferably in the range of 50° C. to 150° C.

The shape of the microfibrillated cellulose used in the production of the modified microfibrillated cellulose is not particularly limited and may be, for example, a sheet, a bulk, a powder, fibers, or a molded material. The resin (A) may be used alone or in combination of two or more types.

The hydrolyzable silyl groups of the hydrolyzable-silyl-group-containing resin (A) can be easily hydrolyzed by causing a reaction between the resin (A) and a predetermined amount of water in the presence of a catalyst such as an acid.

The amount of water for hydrolyzing the hydrolyzable silyl groups of the hydrolyzable-silyl-group-containing resin (A) can be calculated from the amount of the hydrolyzable-silyl-group-containing unsaturated monomer having been polymerized. The hydrolyzable-silyl-group monomer has X4-n hydrolyzable silyl groups represented by a composition formula RnSiX4-n. The hydrolyzable group X is hydrolyzed with water $H_2O$ in a ratio of 1:1. To hydrolyze all the X's in the hydrolyzable group RnSiX4-n, (4-n) water molecules are required. That is, to hydrolyze all the hydrolyzable groups of the hydrolyzable-silyl-group-containing unsaturated monomer (1 mol) polymerized, at least (4-n) mol of water is required. Addition of (4-n) mol of water causes the hydrolytic reaction to proceed. To rapidly and efficiently cause the hydrolysis, water in an amount of (4-n) mol or more may be added. Addition of water in a three-fold amount or more, that is, 3×(4-n) mol or more, can cause the hydrolysis to proceed more rapidly.

By multiplying the number of the moles by the molecular weight of water, 18, the weight of water for hydrolyzing the hydrolyzable silyl groups of the resin (A) can be calculated.

Although the catalyst used for the hydrolysis may be, for example, an acid or an alkali, it is preferably an acid catalyst that can cause the hydrolysis reaction to rapidly proceed. Examples of the acid include various acids such as hydrochloric acid, sulfuric acid, and acetic acid. Of these, hydrochloric acid, which can cause the hydrolysis reaction to rapidly proceed, is preferred. The higher the concentration of hydrochloric acid, the higher the rate of the hydrolysis becomes. However, hydrochloric acid having a high concentration has an irritating odor and handling thereof needs care. Accordingly, hydrochloric acid is preferably diluted and used as diluted hydrochloric acid having a concentration of 10% or less.

To increase the solubility of the acid and water, that is, the aqueous acid, in the hydrolyzable-silyl-group-containing resin (A), a polar solvent may be added: an alcohol such as methanol or ethanol, N,N-dimethylformamide, N,N-dimethylacetamide, dimethyl sulfoxide, or N-methylpyrrolidone.

The process of performing the step of bringing the hydrolyzable-silyl-group-containing resin (A) and the microfibrillated cellulose into contact with each other is not particularly limited and may be, for example, a process of immersing the microfibrillated cellulose into a solution containing the resin (A) or a process of applying a solution containing the resin (A) to the microfibrillated cellulose by dipping, spin-coating, spraying, brush-coating, or roll-coating. The time for the contact may be properly selected and is preferably about 1 minute to about 6 hours.

When the microfibrillated cellulose has the shape of, for example, a powder or fibers, a solution containing the hydrolyzable-silyl-group resin (A) and the microfibrillated cellulose may be brought into contact with each other by kneading. The kneading may be performed with a standard kneading machine such as a planetary mixer, a kneader, or a pressure kneader. During the kneading, the kneading machine may be heated to simultaneously perform the contact and the heat treatment. The heating temperature is preferably equal to or less than the boiling point of the organic solvent contained in the hydrolyzable-silyl-group resin (A) and is preferably adjusted in the range of 50° C. to 150° C.

The amount of the hydrolyzable-silyl-group resin (A) required for the treatment of the microfibrillated cellulose is calculated from the amount of the hydrolyzable-silyl-group-containing unsaturated monomer used as a starting material in the production of the resin (A). The hydrolyzable-silyl-group resin (A) and the microfibrillated cellulose are preferably kneaded such that the weight ratio of the hydrolyzable-silyl-group-containing unsaturated monomer/the microfibrillated cellulose is 1/100 or more, more preferably 1/100 to 1/10.

The modified microfibrillated cellulose obtained by the above-described treatment with the hydrolyzable-silyl-group resin (A) may be further mixed with a resin to provide a composition. The content of the modified microfibrillated cellulose in the resultant resin containing the modified microfibrillated cellulose is preferably 0.1% to 10% by weight, more preferably 0.5% to 5% by weight. When the hydrolyzable-silyl-group-containing resin (A) has another functional group that is not a hydrolyzable silyl group and the modified microfibrillated cellulose is mixed with a resin (B) having a functional group that reacts with the functional group that is not a hydrolyzable silyl group and is in the modified microfibrillated cellulose, the combination of the modified microfibrillated cellulose is facilitated, which is preferred.

(Resin Composition)

The resin mixed with the modified microfibrillated cellulose is not particularly limited. Non-limiting examples of the resin include thermoplastic resins including polylactic acid, polybutylene succinate, vinyl chloride resins, vinyl acetate resins, polystyrene, ABS resins, acrylic resins, polyester resins, polyethylene, polyethylene terephthalate, polypropylene, fluorocarbon resins, amide resins, acetal resins, polycarbonate, cellulose plastic, polyesters such as polyglycolic acid, poly-3-hydroxybutyrate, poly-4-hydroxybutyrate, polyhydroxyvalerate polyethyleneadipate, polycaprolactone, and polypropiolactone, polyethers such as polyethylene glycol, polyamides such as polyglutamic acid and polylysine, and polyvinyl alcohol; and thermosetting resins such as phenolic resins, urea resins, melamine resins, unsaturated polyester resins, epoxy resins, diallyl phthalate resins, polyurethane resins, silicone resins, and polyimide resins. The resins may be used alone or in combination of two or more thereof. Preferred resins are thermosetting resins, and epoxy resins.

(Further Combination with Resin)

When the hydrolyzable-silyl-group-containing resin (A) having been made to bond to or adhere to the modified microfibrillated cellulose has another functional group that is not a hydrolyzable silyl group, the modified microfibrillated cellulose is preferably combined with a resin (B) having a functional group that reacts with the functional group that is not a hydrolyzable silyl group and is in the modified microfibrillated cellulose.

(Functional Group of Resin (B))

The functional group (of the resin (B)) that reacts with the functional group that is not a hydrolyzable silyl group and is in the modified microfibrillated cellulose reacts with the functional group that is not a hydrolyzable silyl group and is in the hydrolyzable-silyl-group-containing resin (A). Examples of the functional group of the resin (B) include a hydroxyl group, a carboxyl group, a vinyl group, an epoxy group, an amino group, an aldehyde group, a thiol group, a sulfonic group, and an azo group. These functional groups may be used alone or in combination.

A process of mixing the modified microfibrillated cellulose with the resin is not particularly limited and a standard process may be employed. Examples of the process include a process of sufficiently impregnating a sheet or a molded body composed of the microfibrillated cellulose with a resin monomer solution and causing polymerization by heat, UV radiation, a polymerization initiator, or the like; or a process of sufficiently impregnating a sheet or a molded body composed of the microfibrillated cellulose with a polymer resin solution or a resin powder dispersion solution and drying the sheet or the molded body; a process of sufficiently dispersing the modified microfibrillated cellulose in a resin monomer solution and causing polymerization by heat, UV radiation, a polymerization initiator, or the like; a process of sufficiently dispersing the modified microfibrillated cellulose in a polymer resin solution or a resin powder dispersion solution and drying the solution; and a process of dispersing the microfibrillated cellulose in a thermally molten resin solution by kneading and subjecting the resultant substance to press forming, extrusion, injection molding, or the like.

Thus, the resin composite material can be produced. Compared with resin composite materials produced from existing microfibrillated cellulose, the resin composite material produced from a modified microfibrillated cellulose according to the present invention is excellent in mechanical properties. This resin composite material can be molded as with other moldable resins. The resin composite material can be molded into a molded product by, for example, extrusion, injection molding, press forming, or the like. Such molding conditions may be appropriately adjusted in accordance with the properties of the combined resin.

EXAMPLES

Hereinafter, the present invention will be described in further detail with reference to Examples. The terms "parts" and "%" in the description indicate that they are based on mass or weight.

Synthesis Example 1

Synthesis of Hydrolyzable-Silyl-Group-Containing Acrylic Resin (i)

To a 3-L stainless-steel separable flask, 468 g of xylene was weighed. This xylene was heated to 100° C. under nitrogen flow while being stirred at 120 rpm. To a 1-L stainless-steel vessel, 315 g of 2-ethylhexyl acrylate, 280 g of glycidyl methacrylate, and 105 g of SZ6030 (Dow Corning Toray Co., Ltd.) were then weighed and the resultant solution was stirred with a glass rod. To this mixture, 105 g of xylene and 84 g of PERBUTYL 0 (NOF CORPORATION) were added and the resultant solution was sufficiently stirred and mixed with a glass rod. This mixture solution was charged into a 1-L dropping funnel and dropped over 4 hours in xylene heated to 100° C. After the dropping was completed, the solution was maintained at 100° C. for 7 hours to cause polymerization. The acrylic resin obtained by the polymerization was defined as a hydrolyzable-silyl-group-containing acrylic resin (i). The hydrolyzable-silyl-group-containing acrylic resin (i) (1 g) was weighed and mixed with 5 g of a toluene/methanol mixture (weight ratio: 7/3). The resultant solution was stirred and placed in a dryer at 120° C. for an hour to evaporate the organic solvents therein. The solid content of the hydrolyzable-silyl-group-containing acrylic resin (i) was calculated from the weight after the evaporation of the organic solvents. The solid content was found to be 56%. The resin concentration was adjusted by adding xylene such that the solid content became 55%.

Synthesis Example 2

Synthesis of Hydrolyzable-Silyl-Group-Containing Acrylic Resin (ii)

An acrylic resin was synthesized as in Synthesis example 1 except that the mixture solution dropped was changed to a solution composed of 595 g of glycidyl methacrylate, 105 g of SZ6030, 105 g of xylene, and 84 g of PERBUTYL O. The acrylic resin obtained by the polymerization was defined as a hydrolyzable-silyl-group-containing acrylic resin (ii). This hydrolyzable-silyl-group-containing acrylic resin (ii) was also adjusted such that the solid content became 55%.

Synthesis Example 3

Synthesis of Hydrolyzable-Silyl-Group-Containing Acrylic Resin (iii)

An acrylic resin was synthesized as in Synthesis example 1 except that the mixture solution dropped was changed to a solution composed of 525 g of 2-ethylhexyl acrylate, 70 g of glycidyl methacrylate, 105 g of SZ6030, 105 g of xylene, and 84 g of PERBUTYL O. The acrylic resin obtained by the polymerization was defined as a hydrolyzable-silyl-group-containing acrylic resin (iii). This hydrolyzable-silyl-group-containing acrylic resin (iii) was also adjusted such that the solid content became 55%.

The synthesis was performed such that the ratio of an epoxy group serving as a reactive functional group to silicon with respect to a single silicon became 4.7 in the hydrolyzable-silyl-group-containing acrylic resin (i), 9.9 in the hydrolyzable-silyl-group-containing acrylic resin (ii), and 1.2 in the hydrolyzable-silyl-group-containing acrylic resin (iii).

<Measurement of Distribution of Number-Average Molecular Weight>

The molecular-weight distribution of the synthesized acrylic resins was determined by measurement with HLC8220 (molecular-weight measurement apparatus, Tosoh Corporation) and calculation of number-average molecular weight in terms of polystyrene standards.

<Preparation of Dried Microfibrillated Cellulose>

To 50 g of CELISH KY100G (cellulose content: 5 g, DAICEL CHEMICAL INDUSTRIES, LTD.), 950 g of ion-exchanged water was added and the resultant solution was stirred with a mixer for a minute. The microfibrillated cellulose was then concentrated by suction filtration. To this concentrated microfibrillated cellulose, 200 g of ethanol was added and the resultant solution was stirred with a TK HOMO DISPER of a TK ROBOMIX (Tokushu Kika Kogyo Co., Ltd.) at 3000 rpm for 10 minutes. The cellulose was then concentrated by suction filtration. The same processes as above were repeated to substitute ethanol for ion-exchanged water contained in the concentrated microfibrillated cellulose. Similar processes were performed with n-butanol instead of ethanol. Similar processes were then performed with pentanol to provide a pentanol/microfibrillated cellulose slurry. This pentanol/cellulose slurry was placed in a dryer at 150° C. for 3 hours to evaporate pentanol. The resultant microfibrillated cellulose was pulverized with a Labo Millser LM-PLUS (OSAKA CHEMICAL Co., Ltd.) to provide dried microfibrillated cellulose.

<Evaluation of Dispersibility of Microfibrillated Cellulose>

To 50 g of EPICLON 850 (epoxy resin, product from DIC Corporation), 45 g of EPICLON B570H (acid anhydride, product from DIC Corporation) was added and sufficiently stirred. To this resin solution, microfibrillated cellulose was added such that the cellulose concentration became 0.5% by weight. The cellulose was subjected to ultrasonic dispersion with an ultrasonic homogenizer Sonifier II (Central Scientific Commerce, Inc.) under ice cooling for 30 minutes. After that, a droplet of the resin solution was dropped on a slide glass. This preparation was placed on a microscope ECLIPSE 90i (Nikon) and the dispersion state of the microfibrillated cellulose in the resin solution was observed at a magnification of 100 times.

<Evaluation of Yield Stress>

To 50 g of EPICLON 850, 45 g of EPICLON B570H was added and sufficiently stirred. To this resin solution, microfibrillated cellulose was added such that the cellulose concentration became 1% by weight. The cellulose was subjected to ultrasonic dispersion with an ultrasonic homogenizer under ice cooling for 30 minutes. After that, the resin solution was defoamed with a vacuum pump while being heated at 70° C. This resin solution was measured in terms of solution viscosity at 25° C. with a viscometer RheoStress RS75 (HAAKE) in a measurement mode Stress Sweep. A linear approximation of the square root of the shear rate and the square root of the viscosity was generated and the intercept of the line was squared to calculate the yield stress.

The yield stress is determined by the measurement of the viscosity of a resin. A low yield stress means that the viscosity is low and ease of handling is good. According to the present invention, the yield stress is low, 50 Pa or less, which indicates that handling of a resin containing microfibrillated cellulose (such as sending of the solution) is facilitated.

<Measurement of Silicon Atom Content>

After the hydrolyzable-silyl-group-containing resin (A) and the microfibrillated cellulose were brought into contact with each other and then heated, 10 g of the mixture solution of the modified microfibrillated cellulose was sampled. To this mixture solution, 80 g of xylene was added and the resultant solution was stirred with a TK HOMO DISPER of a TK ROBOMIX at 3000 rpm for 10 minutes. After that, the solvent was removed by suction filtration and the modified microfibrillated cellulose was washed. Another washing process was performed with xylene. The modified microfibrillated cellulose/xylene slurry (1 g) was then sampled and dried at 150° C. for an hour. The surface of the dried modified microfibrillated cellulose was subjected to elemental analysis at a magnification of 1000 times with an energy dispersive X-ray analyzer (JSM-5900LV, manufactured by JEOL Ltd.) to determine the atomic percent of silicon atoms. This silicon atom content was defined as the amount of the treatment agent adhering to the modified microfibrillated cellulose.

<Measurement of Fracture Toughness>

To 200 g of EPICLON 850 weighed, 180 g of EPICLON B570H was added and sufficiently stirred. To this solution, modified microfibrillated cellulose was added to achieve a concentration of 1% by weight. The modified microfibrillated cellulose was subjected to ultrasonic dispersion with an ultrasonic homogenizer under ice cooling for 40 minutes. To this resin solution, 2 g of N,N-dimethylbenzylamine was added and the resultant solution was stirred with a TK HOMO MIXER of a TK ROBOMIX (Tokushu Kika Kogyo Co., Ltd.) at 8000 rpm for 15 minutes under ice cooling. After that, the resin solution was defoamed with a vacuum pump while being heated at 70° C. The resin was cast into a region between glass plates adjusted to have a gap of 6 mm. The resin was held in a dryer at 110° C. for 3 hours to be cured; and then held in a dryer at 175° C. for 5 hours to be subjected to after-cure.

The resultant cast plate was cut so as to have a width of 12.5 mm and a length of 64 mm. A cut having a width of 0.6 mm and a depth of 5 mm was made in the width direction. A razor blade was driven into the cut to further form a crack having a length of 1 mm. Thus, a test piece was prepared. A fracture toughness test (ASTM 5045) was performed with an AGS-5KNG (Autograph, SHIMADZU CORPORATION) with a span length of 50 mm and at a test speed of 10 mm/min. From the results, the fracture toughness was calculated with the following equations.

<Equations>

$$K1 = P/1000 * S/B/W^{(3/2)} * f(X)$$

$K1c$: fracture toughness (MPa·√m), P: maximum point load (N), S: span length (cm), B: test-piece thickness (cm), W: test-piece width (cm), a: length of cut and crack (cm), X: a/W $$f(X) = 1.5 * X^{(1/2)} * (1.99 - X * (1-X) * (2.15 - 3.93 * X + 2.7 * X^2)) / ((1 + 2*X) * (1-X)^{(3/2)})$$

(Storage Stability)

The microfibrillated-cellulose-containing resins obtained in Examples and Comparative examples were left in a constant temperature apparatus at 25° C. for a week and the resins were visually inspected.

Observation results Good: no change, and transparent

Poor: presence of agglomerates, and turbid

Example 1

To 33.3 g of the hydrolyzable-silyl-group-containing acrylic resin (i), 1.9 g of 6% aqueous solution of hydrochloric acid and 15 g of dimethylformamide were added. The resultant solution was stirred with a stirrer for an hour to hydrolyze methoxysilane of the hydrolyzable-silyl-group-containing acrylic resin (i). To this resin solution, 20.6 g of dried microfibrillated cellulose and 132.8 g of xylene were added. The resultant solution was stirred with a TK HIVIS MIX f model (Tokushu Kika Kogyo Co., Ltd.) at 50 rpm for 6 hours while being heated at 80° C. To 10 g of the modified microfibrillated cellulose resin mixture sampled, 80 g of xylene was added and the resultant solution was stirred with a TK HOMO DISPER of a TK ROBOMIX at 3000 rpm for 10 minutes. The solvent was then removed by suction filtration and the modified microfibrillated cellulose was washed. Another washing process was performed with xylene. Similar washing process was performed twice with ethanol serving as the washing solvent. The resultant modified microfibrillated cellulose/ethanol slurry had a solid content of 22%. This slurry (8.6 parts by weight) was added to 100 parts by weight of an epoxy resin and evaluated in terms of physical properties.

No cellulose agglomerates having a size of 100 μm or more were observed in the epoxy resin. The yield stress was 30.5 Pa. The fracture toughness was 0.89 MPa·√m. The silicon content was 0.15 atomic percent.

The hydrolyzable-silyl-group-containing acrylic resin (i) had a number-average molecular weight of 2323.

Example 2

The microfibrillated cellulose was modified as in Example 1 except that the hydrolyzable-silyl-group-containing acrylic resin (i) was changed to the hydrolyzable-silyl-group-containing acrylic resin (ii).

No cellulose agglomerates having a size of 100 μm or more were observed in the epoxy resin. The yield stress was 32.0 Pa. The fracture toughness was 0.93 MPa·√m. The silicon content was 0.17 atomic percent. The hydrolyzable-silyl-group-containing acrylic resin had a number-average molecular weight of 1892.

Example 3

The microfibrillated cellulose was modified as in Example 1 except that the hydrolyzable-silyl-group-containing acrylic resin (i) was changed to the hydrolyzable-silyl-group-containing acrylic resin (iii).

No cellulose agglomerates having a size of 100 μm or more were observed in the epoxy resin. The yield stress was 33.0 Pa. The fracture toughness was 0.84 MPa·√m. The silicon content was 0.16 atomic percent. The hydrolyzable-silyl-group-containing acrylic resin had a number-average molecular weight of 2168.

Comparative Example 1

The dried microfibrillated cellulose was not modified and was evaluated in terms of the physical properties as in the modified microfibrillated cellulose. A large number of cellulose agglomerates having a size of 100 μm or more were observed in the epoxy resin. The yield stress was 3790 Pa. The fracture toughness was 0.78 MPa·√m. Silicon was not detected in the cellulose surface.

Comparative Example 2

To 2.7 g of 26040 (silane coupling agent, manufactured by Dow Corning Toray Co., Ltd.) as a surface-treatment agent, 10.7 g of 0.05% aqueous solution of acetic acid was added. The resultant solution was stirred with a stirrer for three hours to hydrolyze methoxysilane. To this aqueous solution, 20 g of dried microfibrillated cellulose and 180 g of xylene were added. The resultant solution was stirred with a planetary mixer at 50 rpm for 6 hours while being heated at 80° C., so that the cellulose was surface-treated. To 10 g of the surface-treated microfibrillated cellulose/xylene solution sampled, 80 g of xylene was added and the resultant solution was stirred with a TK HOMO DISPER of a TK ROBOMIX at 3000 rpm for 10 minutes. The solvent was then removed by suction filtration and the microfibrillated cellulose treated with the silane coupling agent was washed. Another washing process was performed with xylene. Similar washing process was performed twice with ethanol serving as the washing solvent. The resultant microfibrillated cellulose treated with the silane coupling agent/ethanol slurry had a solid content of 21%.

No cellulose agglomerates having a size of 100 μm or more were observed in the epoxy resin. The yield stress was 34.3 Pa. The fracture toughness was 0.83 MPa·√m. The silicon content was 0.40 atomic percent.

Z6040 was evaluated in terms of molecular-weight distribution as with the acrylic resins. The number-average molecular weight was found to be 157.

Comparative Example 3

The dried microfibrillated cellulose was treated with the silane coupling agent as in Comparative example 2 except that the stirring with the planetary mixer at 50 rpm was performed for 3 hours under heating at 80° C.

Cellulose agglomerates having a size of 100 μm or more were observed in the epoxy resin. The yield stress was 320 Pa. The fracture toughness was 0.81 MPa·√m. The silicon content was 0.18 atomic percent.

TABLE 1

| | Unit | Example 1 | Example 2 | Example 3 | Comparative example 1 | Comparative example 2 | Comparative example 3 |
|---|---|---|---|---|---|---|---|
| Surface-treatment agent | | Hydrolyzable-silyl-group-containing acrylic resin (i) | Hydrolyzable-silyl-group-containing acrylic resin (ii) | Hydrolyzable-silyl-group-containing acrylic resin (iii) | None | Z6040 | Z6040 |
| Number-average molecular weight of surface-treatment agent | | 2323 | 1892 | 2168 | — | 157 | 157 |
| Amount of functional group with respect to single silicon in surface-treatment agent | | 4.7 | 9.9 | 1.2 | — | 1 | 1 |

TABLE 1-continued

| | Unit | Example 1 | Example 2 | Example 3 | Comparative example 1 | Comparative example 2 | Comparative example 3 |
|---|---|---|---|---|---|---|---|
| Agglomerates having size of 100 μm or more in epoxy resin solution | | Absent | Absent | Absent | Present | Absent | Present |
| Yield stress | Pa | 30.5 | 32.0 | 33.0 | 3790 | 34.3 | 320 |
| Fracture toughness | MPa·√m | 0.89 | 0.93 | 0.84 | 0.78 | 0.83 | 0.81 |
| Silicon content | atomic percent | 0.15 | 0.17 | 0.16 | Not detectable | 0.40 | 0.18 |
| Storage stability | | Good | Good | Good | Agglomeration Poor | Poor | Poor |

INDUSTRIAL APPLICABILITY

According to the present invention, a polymer resin is made to bond to or adhere to microfibrillated cellulose and hence the microfibrillated cellulose can be modified with a small amount of the resin. When the modified microfibrillated cellulose is mixed with another resin, it can be dispersed without causing agglomeration. This dispersibility is probably provided because a hydrolyzable silyl group is introduced into the resin skeleton and hence molecular motion is controlled and a side reaction such as polycondensation between the hydrolyzable silyl groups is less likely to occur. A resin composition containing a modified microfibrillated cellulose according to the present invention can provide a molded resin product excellent in mechanical properties, in particular, fracture toughness. Accordingly, such molded products can be used, for example, in the automobile field, the electrical and electronic field, the civil engineering and construction field, the medical appliance field, and bath and kitchen utensils.

The invention claimed is:

1. A modified microfibrillated cellulose wherein a hydrolyzable-silyl-group-containing resin (A) bonds to or adheres to a cellulose surface,
the modified microfibrillated cellulose has a silicon content of 0.01 to 0.5 atomic percent derived from the hydrolyzable-silyl-group-containing resin (A),
the hydrolyzable-silyl-group-containing resin (A) is a (meth)acrylic resin prepared by (co)polymerizing 1% to 100% by weight of a hydrolyzable-silyl-group-containing unsaturated monomer that is a compound having at least one hydrolyzable silyl group and at least one polymerizable double bond in a single molecule, 99% to 0% by weight of an acrylic monomer, and 0% to 80% by weight of another polymerizable unsaturated monomer that is a polymerizable unsaturated compound that is not the hydrolyzable-silyl-group-containing unsaturated monomer or the acrylic monomer, and
the hydrolyzable silyl group is a silicon-containing group represented by RnSiX4-n (where R represents at least one organic group selected from the group consisting of an alkyl group, an aryl group, and an unsaturated fatty acid residue that have 1 to 10 carbon atoms and optionally have a substituent; X represents an alkoxy group; n represents an integer of 0 to 3; and R and X may be the same as or different from each other).

2. The modified microfibrillated cellulose according to claim 1, wherein the hydrolyzable-silyl-group-containing resin (A) has a number-average molecular weight of 1000 to 3000.

3. The modified microfibrillated cellulose according to claim 1, wherein the hydrolyzable-silyl-group-containing resin (A) has a functional group that is not a hydrolyzable silyl group; and the functional group that is not a hydrolyzable silyl group is one or more selected from a hydroxyl group, a carboxyl group, a vinyl group, an epoxy group, an amino group, an aldehyde group, a thiol group, a sulfonic group, and an azo group.

4. The modified microfibrillated cellulose according to claim 3, wherein the functional group that is not a hydrolyzable silyl group and is in the hydrolyzable-silyl-group-containing resin (A) is an epoxy group.

5. A resin composition comprising the modified microfibrillated cellulose according to claim 1.

6. A resin composition comprising the modified microfibrillated cellulose according to claim 3 in which the hydrolyzable-silyl-group-containing resin (A) has a functional group that is not a hydrolyzable silyl group, and the functional group that is not a hydrolyzable silyl group is one or more selected from a hydroxyl group, a carboxyl group, a vinyl group, an epoxy group, an amino group, an aldehyde group, a thiol group, a sulfonic group, and an azo group; and a resin (B) having a functional group that reacts with the functional group that is not a hydrolyzable silyl group and is in the modified microfibrillated cellulose,
wherein the functional group that reacts with the functional group that is not a hydrolyzable silyl group and is in the modified microfibrillated cellulose is one or more selected from a hydroxyl group, a carboxyl group, a vinyl group, an epoxy group, an amino group, an aldehyde group, a thiol group, a sulfonic group, and an azo group.

7. A resin composite material comprising the modified microfibrillated cellulose according to claim 3 in which the hydrolyzable-silyl-group-containing resin (A) has a functional group that is not a hydrolyzable silyl group, and the functional group that is not a hydrolyzable silyl group is one or more selected from a hydroxyl group, a carboxyl group, a vinyl group, an epoxy group, an amino group, an aldehyde group, a thiol group, a sulfonic group, and an azo group; and a resin (B) having a functional group that reacts with the functional group that is not a hydrolyzable silyl group and is in the modified microfibrillated cellulose, in which the functional group that reacts with the functional group that is not a hydrolyzable silyl group and is in the modified microfibrillated cellulose is one or more selected from a hydroxyl group, a carboxyl group, a vinyl group, an epoxy group, an amino group, an aldehyde group, a thiol group, a sulfonic group, and an azo group, wherein the functional group that is not a hydrolyzable silyl group and is in the hydrolyzable-silyl-group-containing resin (A) has reacted with the functional group of the resin (B) having the functional group that reacts with the functional group that is not a hydrolyzable silyl group and is in the modified microfibrillated cellulose.

8. A method for producing a modified microfibrillated cellulose, comprising bringing a hydrolyzable-silyl-group-containing resin (A) and a microfibrillated cellulose into contact with each other and heating the hydrolyzable-silyl-group-containing resin (A) and the microfibrillated cellulose, wherein
the modified microfibrillated cellulose has a silicon content of 0.01 to 0.5 atomic percent derived from the hydrolyzable-silyl-group-containing resin (A),
the hydrolyzable-silyl-group-containing resin (A) is a (meth)acrylic resin prepared by (co)polymerizing 1% to 100% by weight of a hydrolyzable-silyl-group-containing unsaturated monomer that is a compound having at least one hydrolyzable silyl group and at least one polymerizable double bond in a single molecule, 99% to 0% by weight of an acrylic monomer, and 0% to 80% by weight of another polymerizable unsaturated monomer that is a polymerizable unsaturated compound that is not the hydrolyzable-silyl-group-containing unsaturated monomer or the acrylic monomer, and
the hydrolyzable silyl group is a silicon-containing group represented by $R_nSiX_{4-n}$ (where R represents at least one organic group selected from the group consisting of an alkyl group, an aryl group, and an unsaturated fatty acid residue that have 1 to 10 carbon atoms and optionally have a substituent; X represents an alkoxy group; n represents an integer of 0 to 3; and R and X may be the same as or different from each other).

9. The method for producing a modified microfibrillated cellulose according to claim 8, wherein the hydrolyzable-silyl-group-containing resin (A) has a functional group that is not a hydrolyzable silyl group; and, in a resin, a functional group that reacts with the functional group that is not a hydrolyzable silyl group and is in the modified microfibrillated cellulose is one or more selected from a hydroxyl group, a carboxyl group, a vinyl group, an epoxy group, an amino group, an aldehyde group, a thiol group, a sulfonic group, and an azo group.

10. A method for enhancing a mechanical property of a resin, comprising mixing the modified microfibrillated cellulose according to claim 1 with a resin.

11. The modified microfibrillated cellulose of claim 1, wherein the modified microfibrillated cellulose is hydrophobic.

12. The method for producing a modified microfibrillated cellulose according to claim 8, wherein the modified microfibrillated cellulose is hydrophobic.

* * * * *